Feb. 11, 1936.　　　　E. T. DAHL　　　　2,030,502
CONTROL MECHANISM
Filed Sept. 30, 1932
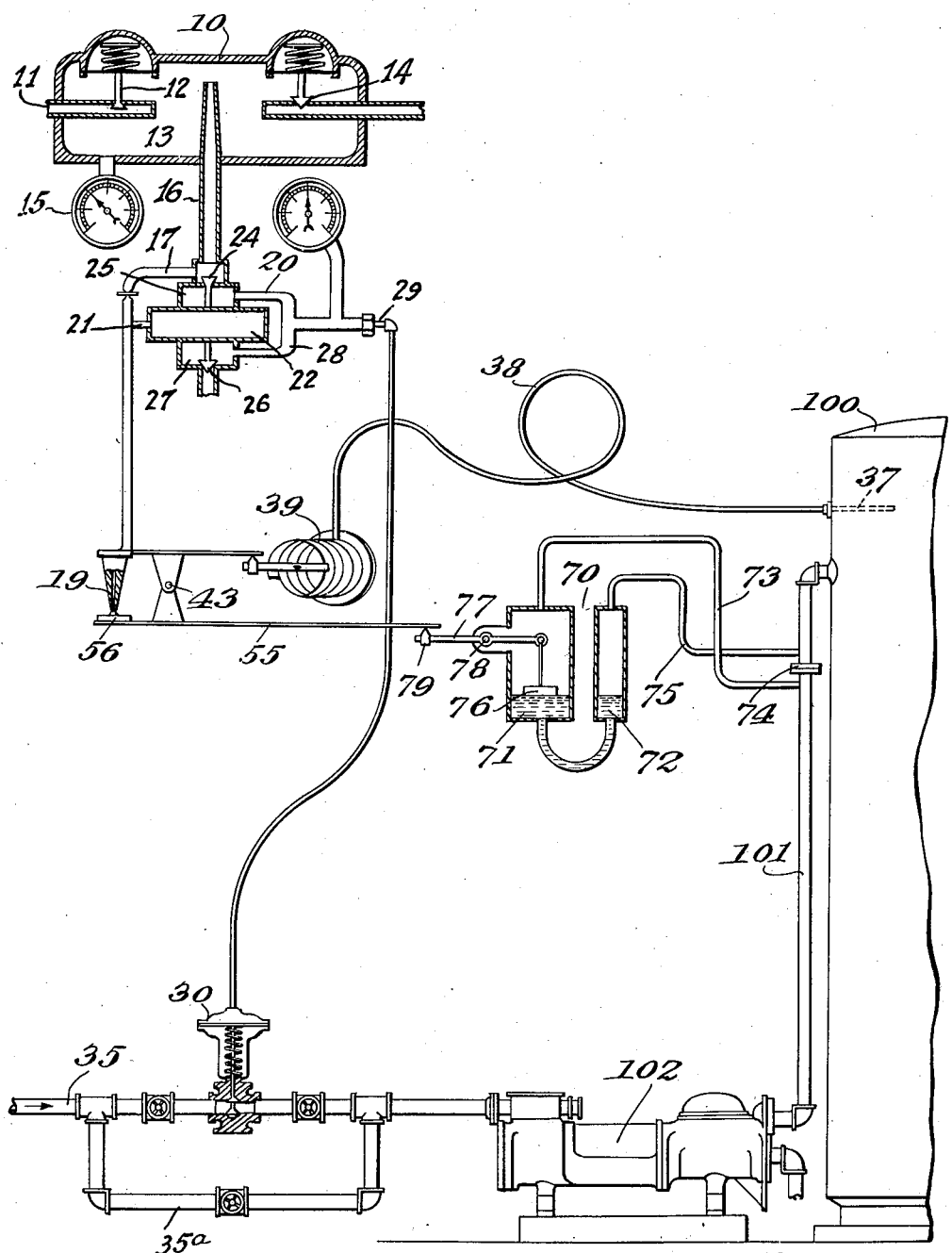
Inventor:
Edward T. Dahl
By Macleod Cahn Copeland P Ah
Attorneys.

Patented Feb. 11, 1936

2,030,502

UNITED STATES PATENT OFFICE 2,030,502

CONTROL MECHANISM

Edward T. Dahl, Randolph, Mass., assignor, by mesne assignments, to Eldon Macleod, Westwood, and Frank A. Morrison, Newton, Mass., and Cameron Macleod, Berwyn, Pa., Leslie Soule, Dedham, and Sullivan A. Sargent, Jr., Needham, Mass., trustees, doing business as Mason.-Neilan Regulator Company, Boston, Mass.

Application September 30, 1932, Serial No. 635,568

20 Claims. (Cl. 236—18)

This invention relates to a control mechanism and more particularly to a mechanism for controlling the temperature of a medium being processed by being subjected to heat in accordance with changes in the rate of flow of a cooling medium.

This invention is a modification and adaptation of the specific principle of control described in my application Serial No. 635,356, filed September 29, 1932, for Control mechanism to which reference is hereby made. The invention herein may be classified as temperature control through changes in the rate of flow of a cooling medium. In my aforementioned application and others copending herewith, I have shown installations in which the temperature of the processed medium is controlled by a processing medium through a heat exchange relationship and also by a fuel acting by its own combustion. I have shown in application Serial No. 635,567, filed September 30, 1932, an installation for controlling the temperature of the processed medium subjected to heat by the addition of a cooling medium supplied by a mechanical means, such as a pump, and in accordance with changes in pressure of the steam operating the pump. Herein I show an installation for controlling the temperature of the processed medium subjected to heat by the addition of a cooling medium supplied by a mechanical means, such as a pump, but in accordance with the changes in the rate of flow of the cooling medium. This installation is specially adapted for use in oil refining, and the tank through which the gasoline being processed is run is heated by any heating medium, but preferably by gaseous or liquid fuel, but the heat supply is not regulated, the temperature control being secured by the addition of a cold reflux such as butane. While the cold reflux is supplied through mechanical means, in this case a pump, preferably operated by steam, the rate of flow of the cooling medium supplied through the pump is controlled through a control valve placed on the steam line to the pump. Possible variations in the pressure of the steam supplied to the pump is not a factor controlled in this installation. A thermostat is placed in the tank where the gasoline is processed, and since much of the fluctuation in the temperature of the processed medium has been discovered to be due to previous fluctuations in the rate of flow of the cooling medium, (whether or not due to previous fluctuations in pressure in the steam operating the pump) an instrument responsive to rate of flow is placed in the cooling medium supply line between the pump and the tank. The thermostat and the rate of flow responsive instrument then operate through their resultant action to control the supply of cooling medium to the pump, by operating on the control valve on the steam line of the pump through an independent pressure system. By this dual control a much more accurate temperature control is obtained over the medium being processed than in previous installations which control by the use of the thermostat alone placed in the processed medium.

This same installation can likewise be used for controlling the temperature of the processed medium by varying the input of the processed medium supplied through the pump and heating it to a predetermined degree, rather than by adding a cold reflux to bring it down to the required temperature. In that case the thermostat is placed in the tank as before, but the rate of flow device is placed on the supply line of the processed medium from the pump. The pump then instead of delivering the cooling medium, delivers the processed medium whose temperature is to be controlled, and the amount of the processed medium delivered is varied with its control temperature and with changes in the rate of flow of the processed medium from the pump.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The drawing shows a diagrammatic view of my dual control mechanism as adapted for temperature control through changes in the rate of flow of a cooling medium.

10 represents the mechanism for maintaining an adequate and constant pressure of air for operating the independent pressure system which in turn operates the control valve on the steam supply line of the pump. The air is supplied through pipe 11 and passes into the reservoir 13 through reducing valve 12, which is preferably set for 15 pounds pressure. A safety relief valve 14 is likewise provided in the mechanism 10, again preferably set for 15 pounds pressure and if pressure in the reservoir 13 exceeds 15 pounds as indicated by gauge 15 the relief valve 14 opens and permits air to escape until the pressure is reduced. The air from reservoir 13 passes down the pipe 16 leading to a diaphragm mechanism 20 and a flexible branch pipe 17 having a fixed orifice 18 bypasses the stream of air. The independent pressure system ordinarily exhausts to the atmosphere through the exhaust orifice 19 but as controlled by the flapper 56 actuated by changes in the rate of flow of the cooling medium supplied by the pump, the independent pressure is diverted through the diaphragm mechanism 20 to the control valve 30 on steam supply line 35 to the pump 102. A by-pass around the valve 30 on the steam line 35 is indicated in the drawing at 35a.

Branch pipe 17 connects with the relay mechanism 20 through pipe 21 below the fixed orifice 18 which leads into a central diaphragm chamber 22. A stem 24 abutting the top side of the diaphragm chamber 22 forms a valve between pipe 16 and chamber 25. A similar stem 26 abutting the bottom side of the diaphragm chamber 22 forms an exhaust valve between the chamber 27 and the atmosphere. Both chambers are connected on the outside by pipe 28 which leads through pipe 29 to the control valve 30. A gauge 31 is connected to pipe 29 and indicates the pressure in said pipe. Control valve 30, which is preferably a diaphragm motor valve, controls the admission of steam to the pump 102.

On the closing of exhaust orifice 19, pressure in diaphragm chamber 22 builds up, forcing valve 26 closed and valve 24 open, allowing pressure from pipe 16 to enter directly into chamber 25, flow through connecting pipe 28 into chamber 27 and equalize the pressures therein. When pressure in chamber 25 balances the force in central chamber 22, valve 24 closes to prevent pressure in 25 from increasing. Air then flows through pipes 28 and 29 from control valve 30, the pressure of which on the diaphragm 32a opens the valve 30 and permits the steam to flow to the pump 102. Valve 30 as here shown opens on movement down.

A tank 100, which may be a stabilizer or vacuum still, or other processing chamber, is provided in which the gasoline or other substance is processed. A thermostat 37 or other temperature responsive instrument containing an expansible fluid is placed in the tank 100 and connects through pipe 38 to a coil 39, Bourdon tube or other pressure responsive device (i. e. pressure responsive when thermostat 37 contains an expansible fluid). A heating medium supplying heat through heat exchange or by its own combustion is understood to be supplied to the tank 100 in any suitable manner (not shown) but at a temperature equal to or greater than that desired for the processed medium. The reflux or cooling medium, such as butane, is supplied to the tank through pipe 101 by means of the pump 102, preferably steam operated through steam supply line 35, although it is understood that any other suitable source of power for operating the pump may be substituted. Pump 102 is constructed in any suitable manner, as well known in the art, and its construction is not part of the invention herein. A control valve 30 is placed on the steam line 35 leading to the pump 102 and is preferably of the diaphragm motor type and is operated by the independent pressure system previously referred to. A mercury manometer or other rate of flow responsive instrument 70 is placed in the cooling medium supply line 101 between the pump 102 and the tank 100. The instrument 70 preferably comprises a mercury manometer, of well known construction, having two pots 71 and 72 and connected at their bottoms, the pot 71 in turn being connected by pipe 73 to the upstream side of an orifice plate 74 placed in the cooling medium supply line 101. The pot 72 is likewise connected by a pipe 75 to the downstream side of the orifice plate 74 in the line 101. A float 76 is arranged in the pot 71 and is attached to one end of an arm 77 fulcrumed at 78 and having a sliding wedge 79 on the other end, in abutting relation to the lever 55, which is itself fulcrumed at point 43.

The device operates in the same manner as that described in my application Ser. No. 635,356, above referred to. An increase in temperature of the gasoline being processed is transmitted to the thermostat 37 and this in turn causes the helical coil 39 to unwind and to partially close orifice 19 diverting the independent pressure to control valve 30, partially opening the same and so increasing the supply of steam operating the pump 102 and thereby increasing the amount of cooling medium delivered to the tank 100. On a decrease in temperature of the gasoline being processed in the tank 100, the action through the temperature coil 39 is opposite. Since fluctuations in the rate of flow of the cooling medium will itself cause fluctuations in temperature of the processed medium, these fluctuations are compensated for by the rate of flow instrument 70 in the cooling medium supply line. An increase in the rate of flow of the cooling medium supplied to the tank 100, for any reason whatsoever, is transmitted through the mercury manometer 70 and will cause the level of the mercury in pot 71 to descend carrying float 76 with it and operating through arm 77 and lever 55 to move flapper 56 away from exhaust orifice 19, with the result that less pressure from the independent pressure system is delivered to control valve 30. Control valve 30 then closes partially, a lesser amount of steam is supplied for driving pump 102 and consequently the rate of flow of the cooling medium or cold reflux is decreased. On a decrease in the rate of flow in the cooling medium supply line 101, the action of the mechanism is opposite. The thermostat 37 and the rate of flow responsive instrument 70 operate independently as their respective conditions change, but the control valve 30 on the steam supply line 35 to the pump 102 is actuated by the resultant of the movements induced by the two instruments.

By means of my invention changes in the temperature of the processed medium are anticipated and fluctuations in the rate of flow of the cooling medium, by any means whatsoever are compensated for through the independent pressure system operating on the control valve 30 on the steam line 35 to the pump 102 before these fluctuations have affected the temperature of the gasoline or other substance being processed. The temperature of the processed medium is governed therefore by the joint and resultant action of the two instruments, one responsive to changes in temperature in the tank and of the processed medium and the other responsive to changes in rate of flow of the cooling medium supplied by the pump. In this way a much more accurate temperature control of the medium being processed is secured and the flow of reflux into the tank is more even and is held constant while the temperature of the processed medium is constant rather than being turned alternately on and off. This eliminates overcontrolling and hunting action, which is highly important in the processing of gasoline or any other medium where accurate temperature is desirable or essential.

I claim:

1. In a control system, a medium subjected to changes in temperature, a second medium acting on the first medium to regulate its temperature and supplied by a power-operated pump, a source of power supply for operating the pump, a control valve on the power supply line controlling the supply of power to the pump, an independent pressure system for operating said control valve, an instrument responsive to changes in temperature of the first medium, a second instrument responsive to changes in rate of flow of the second medium, and means operated by the resultant action of said instruments for controlling the independent pressure system and hence the supply of the second medium.

2. An apparatus for controlling the temperature of a medium to be processed by being subjected to heat supplied by a heating medium, comprising means for supplying a cooling medium to regulate the temperature of the processed medium including a power-operated pump, a source of power supply for operating the pump, a control valve on the power supply line controlling the supply of power to said pump, an independent pressure system for operating said control valve, an instrument responsive to changes in temperature in the processed medium, a second instrument responsive to changes in rate of flow of the cooling medium from the pump, and means operated by the resultant action of said instruments controlling the independent pressure system and hence the supply of the cooling medium.

3. An apparatus for controlling the temperature of a medium to be processed by being subjected to heat supplied by a heating medium including means for supplying a cooling medium to regulate the temperature of the processed medium including a steam-operated pump, a source of steam supply for operating the pump, a control valve on the steam supply line controlling the supply of steam to said pump, an independent pressure system for operating said control valve, an instrument responsive to temperature of the processed medium, an instrument responsive to changes in rate of flow of the cooling medium from the pump, and means operated by the resultant action of the two instruments to control the independent pressure system.

4. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said mechanism, and means responsive to the resultant effect of the temperature of the processed medium and changes in rate of flow of the cooling medium from the pump for actuating said exhaust valve.

5. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said mechanism, means for diverting said pressure to operate said control valve on the closing of said exhaust valve, and joint means responsive to the temperature of the processed medium and the rate of flow of the cooling medium from the pump for actuating said exhaust valve through the resultant action of said temperature and rate of flow.

6. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said pilot mechanism, a supply and waste valve in said pilot mechanism, diaphragm mechanism acted on by said pressure for actuating said valve to divert said pressure to the control valve to operate the same on the closing of the exhaust valve, and joint means responsive to the resultant effect of the temperature of the processed medium and the rate of flow of the cooling medium from the pump for actuating said exhaust valve.

7. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said mechanism, an instrument responsive to temperature of the processed medium, another instrument responsive to changes in the rate of flow of the cooling medium from the pump, and joint means operated by the resultant action of said instruments for actuating the exhaust valve of the independent pressure system.

8. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said mechanism, means for diverting said pressure for operating said control valve on the closing of said exhaust valve, an instrument responsive to the temperature of a processed medium, another instrument responsive to the rate of flow of the cooling medium from the pump, and joint means operated by the resultant action of said instruments for actuating the exhaust valve of the independent pressure system.

9. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said pilot mechanism, a supply and waste valve in said pilot mechanism, diaphragm mechanism acted on by said pressure and actuating said valve for operating the same on the closing of the exhaust valve, an instrument responsive to the temperature of the processed medium, another instrument responsive to the rate of flow of the cooling medium from the pump and joint means operated by the resultant action of said instruments for actuating the exhaust valve of the independent pressure mechanism.

10. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said pilot mechanism comprising a movable orifice and flapper, levers for moving said orifice and flapper toward and away from each other about a common axis and so operating said exhaust valve, a thermostat responsive to the temperature of the processed medium, a manometer responsive to the rate of flow of the cooling medium from the pump, a coil actuated by the thermostat for moving the orifice lever, a float actuated by the manometer for moving the flapper lever and so actuating the exhaust valve of the independent pressure system through the resultant action of said thermostat and manometer.

11. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said pilot mechanism, a thermostat responsive to the temperature of the processed medium, a manometer responsive to the rate of flow of the cooling medium from the pump and joint means operated by the resultant action of said thermostat and manometer for actuating the exhaust valve of the independent pressure system.

12. An apparatus for controlling the temperature of a medium to be processed by being subjected to heat supplied by a heating medium, comprising means for supplying the processed medium including a power-operated pump, a source of power supply for operating the pump, a control valve on the power supply line controlling the supply of power to said pump, an independent pressure system for operating said control valve, an instrument responsive to changes in temperature in the processed medium, a second instrument responsive to changes in rate of flow of the processed medium from the pump, and means operated by the resultant action of said instruments controlling the independent pressure system and hence the supply of the process medium.

13. An apparatus for controlling the temperature of a medium to be processed by being subjected to heat supplied by a heating medium, comprising means for supplying the processed medium including a steam-operated pump, a source of steam supply for operating the pump, a control valve on the steam supply line controlling the supply of steam to said pump, an independent pressure system for operating said control valve, an instrument responsive to temperature of the processed medium, an instrument responsive to changes in the rate of flow of the processed medium from the pump, and means operated by the resultant action of the two instruments to control the independent pressure system.

14. An apparatus for controlling the temperature of a medium to be processed by being subjected to heat supplied by a heating medium, comprising a steam operated pump for supplying a cooling medium to regulate the temperature of the processed medium, a source of steam supply for operating the pump, a control valve on the steam supply line controlling the supply of steam to said pump, a pilot mechanism utilizing an independent source of pressure for operating said control valve and ordinarily exhausting to the atmosphere, an exhaust valve governing the exhaust of said pressure to the atmosphere, a supply and waste valve in said pilot mechanism for supplying and wasting pressure to and from said control valve, diaphragm means in said pilot mechanism acted on by said pressure for actuating the supply and waste valve, and joint means responsive to the resultant effect of the temperature of the processed medium and the rate of flow of the cooling medium from the pump for actuating said exhaust valve.

15. An apparatus for controlling the temperature of a medium to be processed by being subjected to heat supplied by a heating medium, comprising a steam operated pump for supplying a cooling medium to regulate the temperature of the processed medium, a source of steam supply for operating the pump, a control valve on the steam supply line controlling the supply of steam to said pump, a pilot mechanism utilizing an independent source of pressure for operating said control valve and ordinarily exhausting to the atmosphere, an exhaust valve governing the exhaust of said pressure to the atmosphere, a supply and waste valve in said pilot mechanism for supplying and wasting pressure to and from said control valve, diaphragm means in said pilot mechanism acted on by said pressure for actuating the supply and waste valve, an instrument responsive to the temperature of the processed medium, another instrument responsive to the rate of flow of the cooling medium from the pump, and joint means operated by the resultant action of said instruments for actuating the exhaust valve of the independent pressure mechanism.

16. An apparatus for controlling the temperature of a medium to be processed by being subjected to heat supplied by a heating medium, comprising a steam operated pump for supplying a cooling medium to regulate the temperature of the processed medium, a source of steam supply for operating the pump, a control valve on the steam supply line controlling the supply of steam to said pump, a pilot mechanism utilizing an independent source of pressure for operating said control valve and ordinarily exhausting to the atmosphere, an exhaust valve governing the exhaust of said pressure to the atmosphere, including an orifice and flapper, a supply and waste valve in said pilot mechanism for supplying and wasting pressure to and from said control valve, a diaphragm chamber in said pilot mechanism acted on by said pressure for actuating the supply and waste valve, levers for moving said orifice and flapper toward and away from each other about a common axis and so operating said exhaust valve, a thermostat responsive to the temperature of the processed medium, a manometer responsive to the rate of flow of the cooling medium from the pump, a coil actuated by the thermostat for moving the orifice lever, a float actuated by the manometer for moving the flapper lever and so actuating the exhaust valve of the independent pressure system through the resultant action of said thermostat and manometer.

17. An apparatus for controlling the temperature of a medium to be processed by being subjected to heat supplied by a heating medium comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said mechanism, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valve to divert said pressure to the control valve for operating the same on the closing of said exhaust valve, and means responsive to the resultant effect of the temperature of the processed medium and changes in rate of flow of the cooling medium from the pump for actuating said exhaust valve.

18. An apparatus for controlling the temperature of a medium to be processed by being subjected to heat supplied by a heating medium, comprising means for supplying a cooling medium to regulate the temperature of the processed medium including a steam-operated pump, a source of steam supply for operating the pump, a control valve on the steam supply line controlling the supply of steam to said pump, a pilot mechanism utilizing an independent source of pressure for operating said control valve ordinarily exhausting to the atmosphere, an exhaust valve governing the exhaust from said mechanism, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valve to divert said pressure to the control valve for operating the same on the closing of said exhaust valve, an instrument responsive to changes in the rate of flow of the cooling medium from the pump, and joint means operated by the resultant action of said instrument for actuating the exhaust valve of the independent pressure system.

19. An apparatus for controlling the temperature of a medium to be processed by being subjected to heat supplied by a heating medium, comprising a steam operated pump for supplying a cooling medium to regulate the temperature of the processed medium, a source of steam supply for operating the pump, a control valve on the steam supply line controlling the supply of steam to said pump, a pilot mechanism utilizing an independent source of pressure for operating said control valve and ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valve to divert said pressure to the control valve for operating the same on the closing of said exhaust valve, and joint means responsive to the resultant effect of the temperature of the processed medium and the rate of flow of the cooling medium from the pump for actuating said exhaust valve.

20. An apparatus for controlling the temperature of a medium to be processed by being subjected to heat supplied by a heating medium, comprising a steam operated pump for supplying a cooling medium to regulate the temperature of the processed medium, a source of steam supply for operating the pump, a control valve on the steam supply line controlling the supply of steam to said pump, a pilot mechanism utilizing an independent source of pressure for operating said control valve and ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valve to divert said pressure to the control valve for operating the same on the closing of said exhaust valve, an instrument responsive to the temperature of the processed medium, another instrument responsive to the rate of flow of the cooling medium from the pump, and joint means operated by the resultant action of said instruments for actuating the exhaust valve of the independent pressure mechanism.

EDWARD T. DAHL.